US010102242B2

(12) United States Patent
Ireland et al.

(10) Patent No.: US 10,102,242 B2
(45) Date of Patent: Oct. 16, 2018

(54) BULK INITIAL DOWNLOAD OF MOBILE DATABASES

(75) Inventors: Evan Ireland, Wellington (NZ); Brett Donahue, Eagle, ID (US); Guo-ping Zhang, Beijing (CN); Xiong He, Beijing (CN)

(73) Assignee: SYBASE, INC., Dublin, CA (US)

( * ) Notice: Subject to any disclaimer, the term of this patent is extended or adjusted under 35 U.S.C. 154(b) by 229 days.

(21) Appl. No.: 13/275,589

(22) Filed: Oct. 18, 2011

(65) Prior Publication Data

US 2012/0158828 A1    Jun. 21, 2012

Related U.S. Application Data

(60) Provisional application No. 61/425,554, filed on Dec. 21, 2010.

(51) Int. Cl.
*G06F 15/16*      (2006.01)
*G06F 17/30*      (2006.01)

(52) U.S. Cl.
CPC ................ *G06F 17/30383* (2013.01)

(58) Field of Classification Search
CPC ......... G06F 17/30578; G06F 17/30339; G06F 17/30581; G06F 17/30595; G06F 17/30607; G06F 21/602; G06F 17/30383; G06F 11/1458; Y10S 707/99931; Y10S 707/99952; Y10S 707/99954; H04L 67/1095; H04L 63/0428; H04L 9/08
USPC ...... 709/203; 707/999.001, 999.01, 999.201, 707/999.203, E17.005, E17.007, E17.032
See application file for complete search history.

(56) References Cited

U.S. PATENT DOCUMENTS

| | | | | |
|---|---|---|---|---|
| 5,765,173 A | * | 6/1998 | Cane | ................ G06F 11/1453 707/640 |
| 5,926,816 A | * | 7/1999 | Bauer | ............... G06F 17/30578 |
| 5,999,947 A | * | 12/1999 | Zollinger et al. | |
| 6,381,241 B1 | | 4/2002 | Ghirnikar et al. | |

(Continued)

FOREIGN PATENT DOCUMENTS

| KR | 10-2003-0072693 A | 9/2003 |
|---|---|---|
| KR | 10-2006-0060629 A | 6/2006 |
| KR | 10-2011-0074059 A | 6/2011 |

OTHER PUBLICATIONS

Office Communication, dated Sep. 25, 2012, for U.S. Appl. No. 12/813,104, filed Jun. 10, 2010, 14 pages.

(Continued)

*Primary Examiner* — Vivek Srivastava
*Assistant Examiner* — Muhammad Raza
(74) *Attorney, Agent, or Firm* — Sterne, Kessler, Goldstein & Fox P.L.L.C.

(57) ABSTRACT

A system, method, and computer program product are provided for handling bulk initial downloads of databases to mobile devices. Rather than straining the resources of a mobile device to recreate the database locally, a server can construct the database to the mobile device's requirements at the server by impersonating the mobile device. The server can then send the database, compressed and over an encrypted session, to the mobile device. The mobile device can then decrypt and uncompress the pages received, and then encrypt them using a local key for secure storage on a local storage device.

15 Claims, 4 Drawing Sheets

(56) References Cited

U.S. PATENT DOCUMENTS

| | | | |
|---|---|---|---|
| 6,636,242 B2* | 10/2003 | Bowman-Amuah | G06F 17/30607 715/733 |
| 6,694,337 B1* | 2/2004 | King et al. | 707/623 |
| 6,697,846 B1* | 2/2004 | Soltis | G06F 17/30194 707/999.001 |
| 6,983,293 B2 | 1/2006 | Wang | |
| 7,058,200 B2 | 6/2006 | Donescu et al. | |
| 7,130,871 B2 | 10/2006 | Acree et al. | |
| 7,467,389 B2 | 12/2008 | Mukkamala et al. | |
| 7,512,638 B2 | 3/2009 | Jhaveri et al. | |
| 7,551,172 B2 | 6/2009 | Yaron et al. | |
| 7,606,838 B2 | 10/2009 | Tobies | |
| 7,620,659 B2 | 11/2009 | Novik et al. | |
| 7,660,830 B2 | 2/2010 | Ordille | |
| 7,778,962 B2 | 8/2010 | Shah et al. | |
| 7,805,420 B2 | 9/2010 | Kapoor et al. | |
| 7,831,590 B2 | 11/2010 | Gangarapu et al. | |
| 7,853,561 B2 | 12/2010 | Holenstein et al. | |
| 7,882,062 B2 | 2/2011 | Holenstein et al. | |
| 7,945,569 B2 | 5/2011 | Drory et al. | |
| 7,962,458 B2 | 6/2011 | Holenstein et al. | |
| 8,037,056 B2 | 10/2011 | Naicken et al. | |
| 8,046,424 B2 | 10/2011 | Novik et al. | |
| 8,086,661 B2 | 12/2011 | Holenstein et al. | |
| 8,131,670 B2 | 3/2012 | i Dalfo et al. | |
| 8,166,101 B2 | 4/2012 | Shah | |
| 8,200,246 B2 | 6/2012 | Khosravy et al. | |
| 8,218,549 B2 | 7/2012 | Dekel et al. | |
| 8,238,696 B2 | 8/2012 | Dart et al. | |
| 8,542,823 B1* | 9/2013 | Nguyen | G06F 21/6218 380/42 |
| 8,868,510 B2* | 10/2014 | Gurajada et al. | 707/660 |
| 2003/0110085 A1 | 6/2003 | Murren et al. | |
| 2003/0235308 A1* | 12/2003 | Boynton | H04L 51/38 380/270 |
| 2004/0001498 A1 | 1/2004 | Chen et al. | |
| 2004/0133599 A1 | 7/2004 | Warren et al. | |
| 2004/0133644 A1 | 7/2004 | Warren et al. | |
| 2004/0148420 A1 | 7/2004 | Hinshaw et al. | |
| 2004/0177086 A1* | 9/2004 | Florkey | G06F 17/30569 |
| 2004/0205770 A1 | 10/2004 | Zhang et al. | |
| 2005/0021354 A1 | 1/2005 | Brendle et al. | |
| 2005/0055465 A1 | 3/2005 | Sato | |
| 2005/0055698 A1 | 3/2005 | Sasaki et al. | |
| 2005/0235165 A1* | 10/2005 | Gomez | G06F 17/30905 713/193 |
| 2005/0268032 A1 | 12/2005 | Sikdar et al. | |
| 2006/0112398 A1 | 5/2006 | Mukkamala et al. | |
| 2006/0123010 A1 | 6/2006 | Landry et al. | |
| 2006/0147045 A1* | 7/2006 | Kim | G11B 20/00086 380/277 |
| 2007/0073808 A1 | 3/2007 | Berrey et al. | |
| 2007/0083467 A1* | 4/2007 | Lindahl | G11B 20/00086 705/50 |
| 2007/0099640 A1 | 5/2007 | Khushu et al. | |
| 2007/0100834 A1 | 5/2007 | Landry et al. | |
| 2007/0260475 A1 | 11/2007 | Bhanote | |
| 2007/0260628 A1* | 11/2007 | Fuchs et al. | 707/101 |
| 2007/0271275 A1 | 11/2007 | Fassette et al. | |
| 2008/0104133 A1 | 5/2008 | Chellappa et al. | |
| 2008/0120304 A1* | 5/2008 | Calio et al. | 707/10 |
| 2008/0155525 A1 | 6/2008 | Ho | |
| 2008/0176536 A1 | 7/2008 | Galluzzo et al. | |
| 2008/0177975 A1* | 7/2008 | Kawamura | 711/173 |
| 2008/0288459 A1* | 11/2008 | Kim | G06F 17/30905 |
| 2008/0310633 A1* | 12/2008 | Brown | G06F 21/86 380/259 |
| 2009/0036102 A1 | 2/2009 | Ho | |
| 2009/0037395 A1 | 2/2009 | Ireland et al. | |
| 2009/0037430 A1 | 2/2009 | Mukkamala et al. | |
| 2009/0059512 A1 | 3/2009 | Lydon et al. | |
| 2009/0171679 A1 | 7/2009 | Salgado et al. | |
| 2009/0177800 A1 | 7/2009 | Gidron et al. | |
| 2009/0187622 A1 | 7/2009 | Lei | |
| 2009/0198722 A1 | 8/2009 | Kim et al. | |
| 2009/0217051 A1* | 8/2009 | Bacci | H04H 20/38 713/176 |
| 2009/0222402 A1 | 9/2009 | Konrad | |
| 2009/0247134 A1 | 10/2009 | Jeide et al. | |
| 2009/0254601 A1 | 10/2009 | Moeller et al. | |
| 2009/0307284 A1 | 12/2009 | Welingkar et al. | |
| 2010/0011075 A1 | 1/2010 | Klassen et al. | |
| 2010/0030783 A1 | 2/2010 | Ho et al. | |
| 2010/0062770 A1* | 3/2010 | Flynn et al. | 455/436 |
| 2010/0169451 A1 | 7/2010 | Barry | |
| 2011/0154315 A1 | 6/2011 | Singh et al. | |
| 2011/0161290 A1 | 6/2011 | Waterman et al. | |
| 2011/0161339 A1 | 6/2011 | Ireland et al. | |
| 2011/0161349 A1 | 6/2011 | Ireland et al. | |
| 2011/0161383 A1 | 6/2011 | Ho et al. | |
| 2011/0163339 A1 | 7/2011 | Negishi et al. | |
| 2012/0158795 A1 | 6/2012 | Ireland | |
| 2012/0166446 A1 | 6/2012 | Bowman et al. | |
| 2012/0303953 A1* | 11/2012 | Peng | H04L 9/0866 713/165 |
| 2017/0116431 A1* | 4/2017 | Lee | G06F 21/6218 |

OTHER PUBLICATIONS

Office Communication, dated Aug. 27, 2012, for U.S. Appl. No. 13/286,372, filed Nov. 1, 2011, 12 pages.

Office Communication, dated Apr. 25, 2012, for U.S. Appl. No. 12/503,573, filed Jul. 15, 2009, 14 pages.

Office Communication, dated Mar. 7, 2012, for U.S. Appl. No. 12/797,975, filed Jun. 10, 2010, 8 pages.

Office Communication, dated Jun. 27, 2012, for U.S. Appl. No. 12/797,975, filed Jun. 10, 2010, 9 pages.

Office Communication, dated Apr. 11, 2012, for U.S. Appl. No. 12/813,104, filed Jun. 10, 2010, 16 pages.

Notification of Transmittal of the International Search Report and Written Opinion, dated May 29, 2012, for PCT Appl. No. PCT/US2011/065197, 9 pages.

Aboulnaga, A., and Aref, W. G., "Window Query Processing in Linear Quadtrees," in Distributed and Parallel Databases, vol. 10, pp. 111-126 (2001).

Aref, W. G. and Samet, H., "Efficient Window Block Retrieval in Quadtree-Based Spatial Databases," in GeoInformatica, vol. 1, Chapter 1, pp. 59-91 (Apr. 1997).

Aref, W. G. and Samet, H., "Estimating Selectivity Factors of Spatial Operations," in Foundations of Models and Languages for Data and Objects, A. Heuer, & M. H. Scholl edition, pp. 31-43 (Aug. 14, 1993).

Fang, Y. et al., "Spatial Indexing in Microsoft SQL Server 2008," in Proceedings of the 2008 ACM SIGMOD International Conference on Arrangement of Data, ACM, New York, NY, pp. 1207-1215 (2008).

Gargantini, I., "An Effective Way to Represent Quadtrees," in Communications of the ACM, vol. 25, No. 12, ACM, New York, NY, pp. 905-910 (Dec. 1982).

Kothuri, R. K. V. et al., "Quadtree and R-Tree Indexes in Oracle Spatial: A Comparison Using GIS Data," in Proceedings of the 2002 ACM SIGMOD International Conference on Management of Data, ACM, New York, NY, pp. 546-557 (2002).

Kriegel, H.-P. et al., "Statistic Driven Acceleration of Object-Relational Space-Partitioning Index Structures," in Database Systems for Advances Applications, 14 pages, Jeju Island, Korea, Springer (2004).

Orenstein, J. A., "Redundancy in Spatial Databases," in Proceedings of the 1989 ACM SIGMOD International Conference on Management of Data, ACM, New York, NY, USA, pp. 294-305 (1989).

Samet, H., *Foundations of Multidimensional and Metric Data Structures*, Morgan Kaufmann, pp. 28-48, 191-193, 204-205, and 211-220 (2006).

Office Action dated Jan. 3, 2012 in U.S. Appl. No. 12/760,233, Waterman et al., filed Apr. 14, 2010, 8 pages.

(56) References Cited

OTHER PUBLICATIONS

Office Action dated Jul. 3, 2012 in U.S. Appl. No. 12/760,233, Waterman et al., filed Apr. 14, 2010, 9 pages.
Office Action dated Aug. 10, 2012 in U.S. Appl. No. 12/649,527, Ho et al., filed Dec. 30, 2009, 12 pages.
U.S. Appl. No. 13/478,181, Lorenz et al., filed May 23, 2012, entitled "Cache Conflict Detection".
U.S. Appl. No. 13/478,185, Lorenz et al., filed May 23, 2012, entitled "Composite Graph Cache Management".
U.S. Appl. No. 13/286,372, filed Nov. 1, 2011, entitled "Entity Triggers for Materialized View Maintenance".
Linthicum, David S., "Chapter 20, EAI Moving Forward," In Enterprise Application Integration, Addison-Wesley, XP000002659187, ISBN: 0-201-61583-5, pp. 339-349.
Linthicum, David S., "Chapter 11: Database-Oriented Middleware and EAI", In Enterprise Application Integration, Addison-Wesley, XP002579155, ISBN: 978-0-201-61583-8, pp. 191-208, May 1, 2000.
Sinitsyn, A. "A Synchronization Framework for Personal Mobile Servers," In: Proceedings of IEEE on Passive Computing and Communications Workshops, 2nd Annual Conference, 2004, See abstract, p. 4.
Office Communication, dated Sep. 19, 2011, for U.S. Appl. No. 12/503,573, filed Jul. 15, 2009, 12 pages.
Notification of Transmittal of the International Search Report and Written Opinion, dated Mar. 18, 2010, for PCT Appl. No. PCT/US2009/004343, 11 pages.
Notification of Transmittal of the International Search Report and Written Opinion, dated Aug. 2, 2011, for PCT Appl. No. PCT/US2010/060293, 11 pages.
Notification of Transmittal of the International Search Report and Written Opinion, dated Jul. 28, 2011, for PCT Appl. No. PCT/US2010/060290, 10 pages.
Notification of Transmittal of the International Search Report and Written Opinion, dated Aug. 5, 2011, for PCT Appl. No. PCT/US2010/060296, 9 pages.
Extended European Search Report, dated Sep. 27, 2011, for European Patent Appl. No. 09803252.7, 7 pages.
English Abstract for Korean Patent Pub. No. 10-2003-0072693 A, published Sep. 19, 2003, 1 page, from http://worldwide.espacenet.com.
English Abstract for Korean Patent Pub. No. 10-2006-0060629 A, published Jun. 5, 2006, 1 page, from http://worldwide.espacenet.com.
English Abstract for Korean Patent Pub. No. 10-2011-0074059 A, published Jun. 30, 2011, 1 page, from http://worldwide.espacenet.com.
Non-Final Office Action dated Feb. 18, 2014 in U.S. Appl. No. 12/977,707, Bowman et al., filed Dec. 23, 2010, 29 pages.

\* cited by examiner

BULK INITIAL DOWNLOAD OF MOBILE DATABASES

CROSS-REFERENCE TO RELATED APPLICATIONS

The present application claims the benefit of U.S. Provisional Patent Application No. 61/425,554, filed Dec. 21, 2010 and entitled, "Bulk Initial Download of Mobile Databases", which is incorporated herein by reference in its entirety.

The present application is also related to co-pending U.S. patent application Ser. No. 12/813,104, filed on Jun. 10, 2010 and entitled "Message Based Synchronization for Mobile Business Objects", which is incorporated herein by reference in its entirety.

BACKGROUND OF INVENTION

Field of the Invention

The present invention relates generally to databases and, in particular, to database synchronization.

Description of the Background Art

Relative to a server-class computer system, a mobile device has a relatively slow CPU and relatively slow input/output performance (e.g., for reading/writing database files on media cards). A mobile device also has a relatively small amount of memory (e.g., RAM), which limits the effectiveness of any kind of in-memory database cache, such as a row cache or page cache.

As a result, the time taken for a mobile device to synchronize an initial database from a server can be excessive. CPU and I/O utilization can reach capacity during this time, rendering the mobile device unresponsive for the duration of the initial download. Initial synchronization of a 25 Mb database from a server to a mobile device common in use in 2010 can take upwards of 48 hours, during which time the device is rendered barely usable for its normal functions, such as for placing or receiving telephone calls.

Accordingly, what is desired is a mechanism to synchronize an initial database without excessive resource utilization by the mobile device.

SUMMARY OF INVENTION

Embodiments of the invention include a method comprising receiving a subscription request from a client, impersonating the client to generate a temporary database file based on the subscription request, and transmitting the temporary database file to the client.

Embodiments of the invention also include a computer-readable storage device having computer-executable instructions stored thereon that, if executed by a computing device, cause the computing device to perform operations comprising receiving a subscription request from a client, impersonating the client to generate a temporary database file based on the subscription request, and transmitting the temporary database file to the client.

Embodiments of the invention also include a system comprising a memory configured to store modules comprising a receiving module configured to receive a subscription request from a client, an impersonating module configured to impersonate the client to generate a temporary database file based on the subscription request, and a transmitting module configured to transmit the temporary database file to the client, and one or more processors configured to process the modules.

Embodiments of the invention also include a method comprising transmitting a subscription request to a server, receiving a page of a database file based on the subscription request, encrypting the page of the database file, and writing the encrypted page of the database file to a storage device.

Embodiments of the invention also include a computer-readable storage device having computer-executable instructions stored thereon that, if executed by a computing device, cause the computing device to perform operations comprising transmitting a subscription request to a server, receiving a page of a database file based on the subscription request, encrypting the page of the database file, and writing the encrypted page of the database file to a storage device.

Embodiments of the invention also include a system comprising a memory configured to store modules comprising a transmitting module configured to transmit a subscription request to a server, a receiving module configured to receive a page of a database file based on the subscription request, an encrypting module configured to encrypt the page of the database file, and a writing module configured to write the encrypted page of the database file to a storage device, and one or more processors configured to process the modules.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
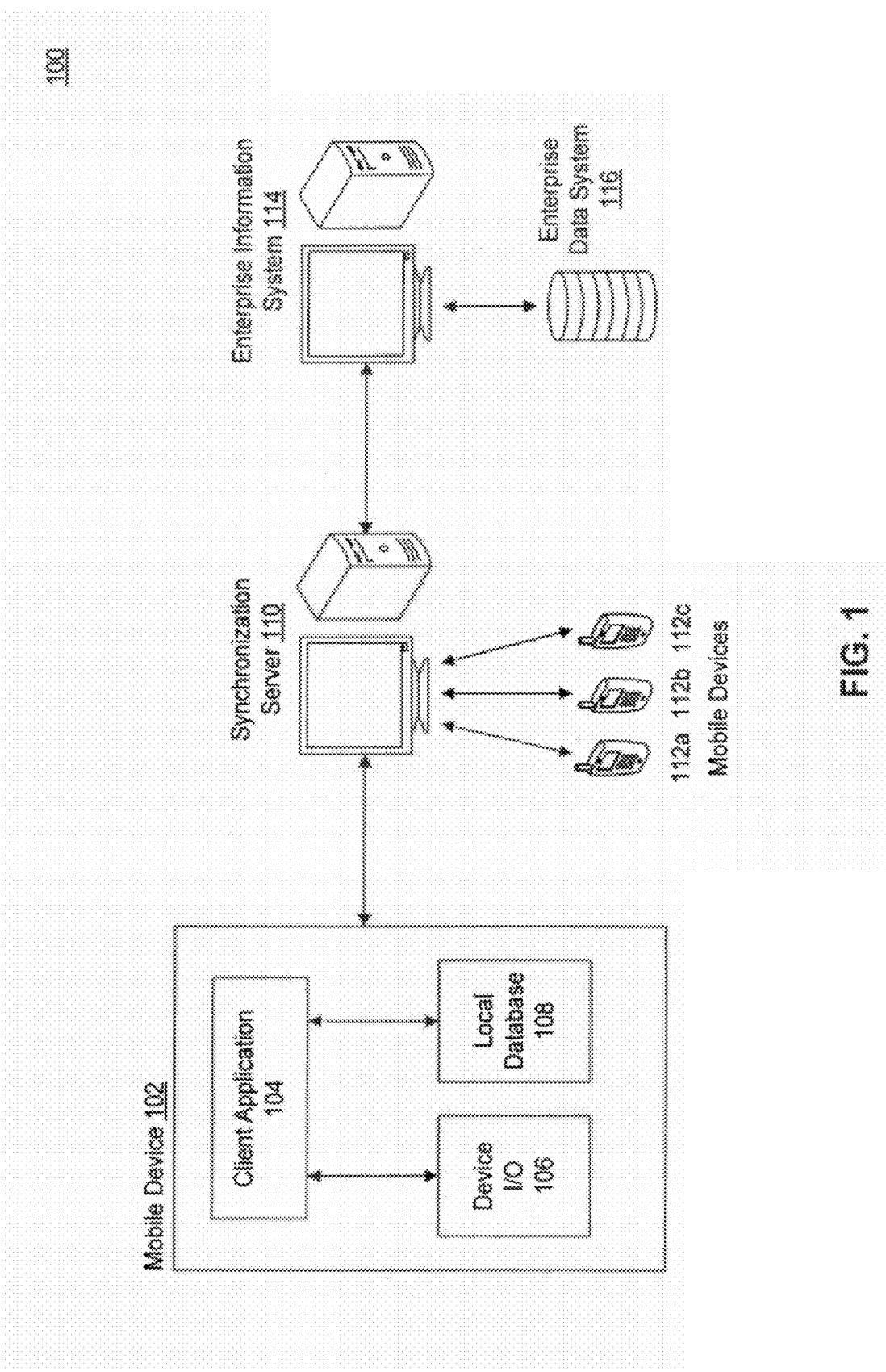
FIG. 1 is an exemplary enterprise network, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

FIG. 1 is an exemplary enterprise network 100, in accordance with an embodiment of the present invention. The enterprise network 100 includes a mobile device 102, in accordance with a further embodiment of the present invention. Mobile device 102 may include, by way of example and not limitation, mobile devices including Java-enabled phones with CLDC 1.1 Java mobile runtime environment such as the BLACKBERRY by RESEARCH IN MOTION of Waterloo, Ontario, Canada; the APPLE IPHONE and IPAD by APPLE COMPUTER, INC. of Cupertino, Calif.; Java-enabled phones with the GOOGLE ANDROID operating system by GOOGLE INC. of Mountain View, Calif.; and the WINDOWS PHONE by MICROSOFT CORPORATION of Redmond, Wash. One skilled in the relevant arts will recognize that techniques described herein as applicable to mobile device 102 may also generally be applied to non-mobile devices as well, such as, for example, a personal computer.

In accordance with an embodiment of the present invention, mobile device 102 has a client application 104 installed thereon. Client application 104 is able to interface with device inputs and outputs ("I/O") 106, such as, for example, a monitor, keypad, or touchscreen display, in accordance with an embodiment of the present invention. Client application 104 is also able to interface with a local database 108, which stores a set of data intended for use by client application 104. In accordance with an embodiment of the present invention, local database 108 is encrypted by a device-specific encryption key.

Mobile device 102 is in communication with synchronization server 110, in accordance with an embodiment of the present invention. Additional mobile devices 112a-c are similarly in communication with synchronization server 110, in accordance with a further embodiment of the present invention. The various mobile devices can be connected to synchronization server 110 via any one or more communications channels, as would be understood by one skilled in the relevant art. For example, connectivity between mobile device 102 and synchronization server 110 may involve, in an exemplary embodiment, communication hops over both a cellular communication network and the Internet. The various communication hops may themselves be either public or private networks, and may include components located on the Internet as well as various private intranets.

Synchronization server 110 sits between the one or more mobile devices 102 and 112a-c and an Enterprise Information System ("EIS") 114, in accordance with an embodiment of the present invention. Synchronization server 110 assists in capturing changes to relevant data made by the EIS 114 and providing the changes to mobile devices 102 and 112a-c. Synchronization server 110 also assists in capturing changes made by the mobile devices 102 and 112a-c and providing the changes to EIS 114. In this manner, data available to a mobile device 102 in local database 108 can be synchronized with data from the corresponding data store of EIS 114, the enterprise data system 116 (or "central database"). In accordance with an embodiment of the present invention, synchronization server 110 maintains a cache reflecting the data from enterprise data system 116.

EIS 114 is connected to synchronization server 110 in order to allow synchronization server 110 to provide the aforementioned data synchronization services, in accordance with an embodiment of the present invention. Communications between EIS 114 and synchronization server 110 can likewise be through any communication channels, as would be understood by one skilled in the relevant art. One skilled in the relevant arts will further understand that EIS 114 and synchronization server 110 may share a same physical server or distributed server as separate software components therein, or may even be compiled as a single combined application. Therefore, it is understood that synchronization server 110 and EIS 114 may be disposed in a number of different locations within enterprise network 100, and are shown as separate computing devices in FIG. 1 by way of example, and not limitation.

As previously noted, EIS 114 further includes, or is otherwise communicatively coupled to, an enterprise system 116, in accordance with an embodiment of the present invention. In accordance with a further embodiment of the present invention, data within local database 108 comprises a subset of data from enterprise data system 116. This data may be in for the form of a mobile business object ("MBO"), in accordance with an embodiment of the present invention. An MBO is a business object that can be synchronized between enterprise information system 114 and mobile device 102. The MBO can be persisted, by storage in local database 108, in order to allow for access by the mobile device 102 during periods without connectivity to EIS 114. A non-limiting example of MBOs is provided in U.S. patent application Ser. No. 12/503,573, filed on Jul. 15, 2009, entitled "Metadata Driven Mobile Business Objects," which is incorporated by reference herein in its entirety.

Client applications 104 running on mobile device 102 access (read and write) to the local database 108. The local database 108 is accessed by client application 104 via generated classes, where each class (corresponding to the aforementioned MBOs) represents one table, in accordance with an embodiment of the present invention.

Communications between client application 104 and synchronization server 110 may be handled in a number of different ways, as will be recognized by one skilled in the relevant art. In accordance with an embodiment of the present invention, a communications framework is embedded directly within client application 104 as provided by a code generator or by a developer. In accordance with an additional embodiment of the present invention, a helper application may be deployed on mobile device 102 to manage the communications.

II. Updating the Local Database

The data on central database 116 is synchronized with the data in local database 108 through the use of a database synchronization system, such as synchronization server 110, in accordance with a non-limiting example embodiment of the present invention. For example, when client application 104 first creates a local database 108, it sends a subscription request to the server system 114. The server 114 responds by sending, for each database table, a set of rows that need to be inserted into the client's local database. This set of rows may or may not be the same set of rows that would be sent to a different mobile device 112*a*-*c* for a different user. The client application inserts these rows one at a time into local database 108, and maintains table indexes, until all the rows have been inserted.

The potentially numerous insertions that must be made by client application 104 into local database 108 can overwhelm the resources of mobile device 102. A number of solutions have been considered to alleviate this problem. One solution is prepared statement caching. Rather than the client application 104 asking the mobile database software managing local database 108 to parse a SQL "insert" statement every time a row is to be inserted, the parsed statement can be reused. This may potentially reduce the initial download time by 5-10%, for example.

Another approach is to use long transactions. Since most database systems incur a not insignificant cost for every committed transaction, multiple insert statements can be executed in a single transaction to reduce transaction commit costs as a proportion of the overall download time. Either the complete download can operate as a single transaction, or as a set of transactions each of which is for a batch of inserted rows. As an example, the use of long transactions might improve download performance by a factor of between 3 and 10, although during that shortened download period, the device can still become quite unresponsive.

An additional approach is to send preformatted rows. Typically, a mobile device database 108 stores each table row as a contiguous sequence of bytes, and multiple rows (as many as will fit) are grouped together into fixed length pages (e.g. 1024 bytes). If a SQL "insert" statement is executed with a set of prepared statement parameters, the corresponding sequence of bytes must be constructed from the set of parameter values. If the server knows the expected row representation of the mobile device database, the server can send each row as a preformatted sequence of bytes, reducing the CPU utilization of the mobile device. As an example, the use of preformatted rows might improve download performance by a factor of 5, although during the shortened download period, the device can still be quite unresponsive, because packing of rows into pages and index maintenance still consumes a lot of CPU time and results in many input/output operations to the storage media on which local database 108 is held.

Yet another approach is to send pregenerated databases to mobile device 102. The server 114 can be configured to occasionally generate a client database as a file, which is downloaded by each mobile device 102 and 112*a*-*c* when it first subscribes. Simple file download to a mobile device 102 can be quite fast, e.g. a few seconds per megabyte, depending on the speed of the network (or cable) connection between the device and the server. If a database contains a lot of reference data, such as a product catalog, this technique can be particularly effective. However when the set of rows is not the same for each device, then a pregenerated database will not be appropriate. Also if the client database must be encrypted with a device-specific encryption key, then the server will not be able to send to the device an appropriately encrypted database, unless the client first sends its encryption key to the server, which may be considered an unacceptable security risk.

III. Bulk Download Synchronization and Encrypt-on-Write

Figure 2:
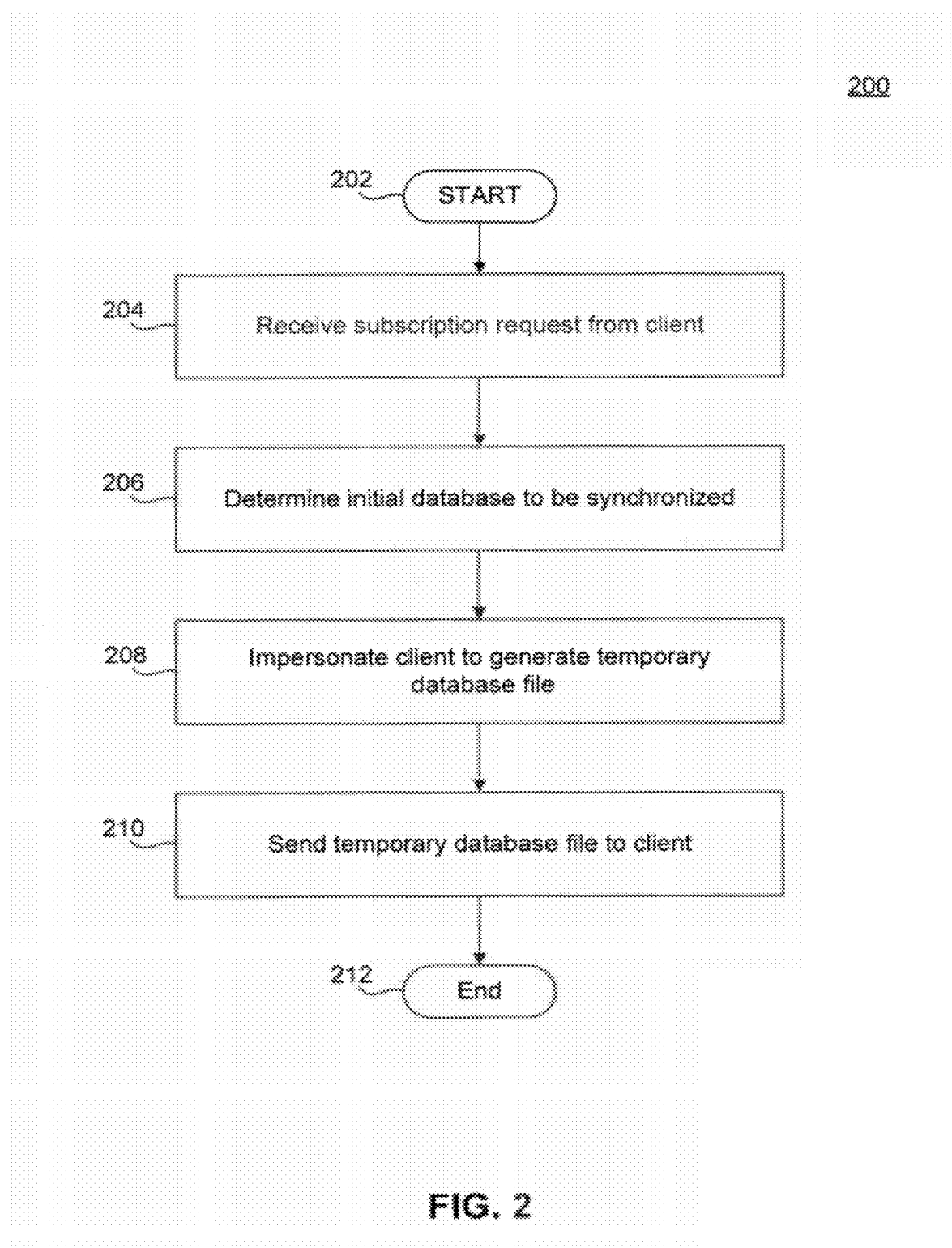
FIG. 2 is a flowchart illustrating steps by which a bulk download synchronization is accomplished, in accordance with an embodiment of the present invention.

FIG. 2 is a flowchart 200 illustrating steps by which a bulk download synchronization is accomplished, in accordance with an embodiment of the present invention. Flowchart 200 is described with continued reference to exemplary enterprise network 100 of FIG. 1. The method begins at step 202 and proceeds to step 204 where server 114 receives a subscription request from client application 104, running on the mobile device 102, indicating that it wishes to download its initial database to be stored at local database 108. In accordance with an embodiment of the present invention, this request is handled through synchronization server 110. In accordance with a further embodiment of the present invention, the initial database comprises a subset of the total data available in central database 116.

In accordance with an embodiment of the present invention, the client application 104 indicates in this request which operating system software and database system software it is using, as well as its desired database page size. The server 114 is expected to have compatible database system software installed for each database software variant that might be needed for any of the mobile devices 102 and 112*a*-*c* that might be expected to connect to it.

At step 206, server 114 determines which portion of the data in enterprise data system 116 will be transmitted to client application 104 for synchronization. The precise data may vary based on, by way of non-limiting example, the contents of the subscription request of step 204, or the mobile device 102 and 112*a*-*c* making the request.

In accordance with an embodiment of the present invention, the server 114 process checks if it has a bulk download program that can generate a suitable database for the client application 104, based on the client's indicated operating system and database system software used by local database 108. If the server process cannot find a suitable bulk download program, it invokes its code generator to generate one, by generating code for the server (a bulk download program) that will emulate the code that would normally be generated for use on a mobile device (i.e. the MBO classes). In accordance with another embodiment of the present invention, generation of a suitable database for client application 104 is accomplished by consulting metadata information regarding the structure of local database 108. One skilled in the relevant arts will further recognize that the suitable database can be generated by other mechanisms, including a combination of a bulk download program (either pre-configured or generated) and metadata.

At step 208, the server 114 process starts a task (thread or subprocess) which runs the bulk download program, in accordance with an embodiment of the present invention. This task impersonates the original client, and makes a loopback connection to the server 114 to download the initial data and insert it into a temporary database file (unencrypted, or encrypted using a server-specific encryption key) on the server's 114 disk. This task can benefit from the comparably expansive resources of server 114 by, for example, utilizing a large database cache size (making effective use of server RAM to reduce disk I/O), and using long transactions (or a single transaction) for the rapid construction of the temporary database file.

At step 210, the server 114 process then starts another task to transmit the temporary database file over the network to the mobile device 102, in accordance with an embodiment of the present invention. The file can be sent in chunks, where each chunk is one or more pages according to the client's requested page size, in order to improve transmission speeds. In accordance with an embodiment of the present invention, to avoid clear-text interception of the temporary database file, each chunk is compressed and then encrypted (with a client/server-negotiated session key, for example such as would be used over a standard HTTPS network connection) as it is transferred over the network to the client application 104 on mobile device 102. The method then ends at step 212.

Figure 3:
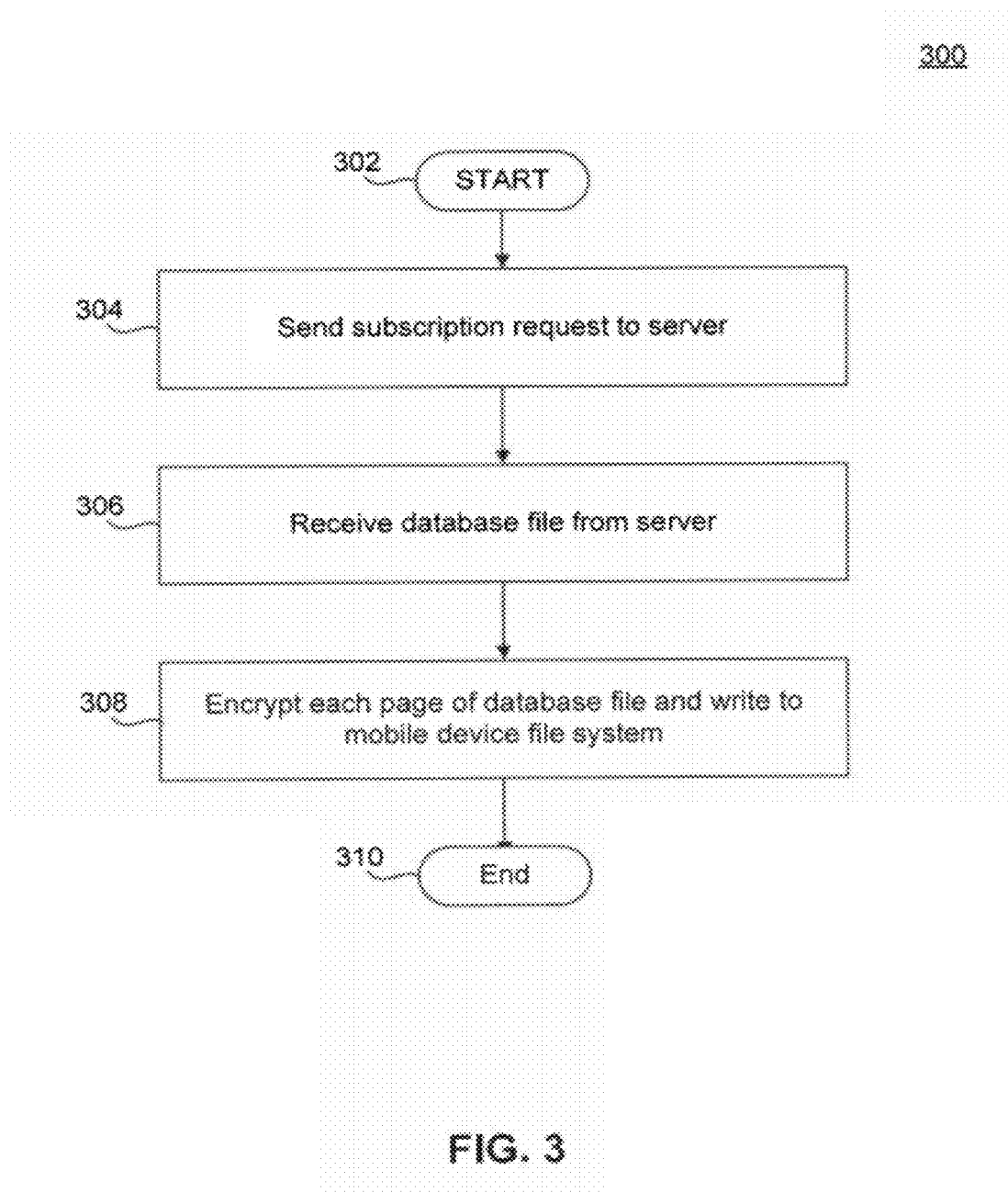
FIG. 3 is a flowchart illustrating steps by which a client application receives a bulk download, in accordance with an embodiment of the present invention.

The manner by which database synchronization is requested and handled by mobile device 102 is now described. FIG. 3 is a flowchart 300 illustrating steps by which a client application 104 receives a bulk download, in accordance with an embodiment of the present invention. The method begins at step 302 and proceeds to step 304 where the client application 104 sends a subscription request to server 114 (possibly via synchronization server 110), in accordance with an embodiment of the present invention. This subscription request is analogous to the request received by server 114 at step 204 of FIG. 2.

At step 306, mobile device 102 receives the database file from server 114. The mobile device 102, upon receiving each chunk over the network, decrypts (with the client/server-negotiated session key) and then uncompresses the chunk. At step 308, for each page in the chunk, mobile device 102 encrypts that page using the client-specific database encryption key, and writes that page out to a file on the mobile device file system (e.g. media card). This behavior is termed "encrypt-on-write". The method then ends at step 310.

When all pages have been received by the client 102, the temporary database file can be deleted from the server's 114 file system.

In accordance with an embodiment of the present invention, the encrypt-on-write scheme relies on the ability to correctly encrypt any given database page knowing (1) the page contents (a sequence of bytes whose length is the negotiated page size), (2) the encryption key, and (3) the page number. By way of non-limiting example, if the encryption algorithm used is AES/CBC, then the page number can be used to derive an initial vector, which is provided to the AES/CBC encryption library on the device together with the page contents and encryption key. Therefore, the client database software needs to support page-based encryption.

Client database encryption schemes where some pages are not encrypted, and the determination of whether or not a page is encrypted depends on information contained at arbitrary positions within the database file (such as page tables), will in general be incompatible with encrypt-on-write. The encryption algorithm used by the encrypt-on-write component of the system is generally provided by the client database software as a callable API, injected into the database software, or replicated in both the database software and the encrypt-on-write component.

One skilled in the relevant arts will appreciate that encrypt-on-write is not necessary in order to realize the benefits described herein. Notably, a number of these benefits can be realized even if the client is not capable of implementing encrypt-on-write. For example, the server can encrypt the temporary database file using the client's encryption key, such that the client can simply write the database file to its file system upon receipt without further encryption. However, this requires the client 104 entrusting server 114 with its encryption key. Moreover, this encryption would have to occur prior to any compression, unlike the compression/encryption of communications which will be decrypted/uncompressed by mobile device 102. The encrypted file would be relatively uncompressible over the network. As an example, the data stream transmitted over the network might be ten or more times larger than if the client database could support encrypt-on-write. It is therefore beneficial for the mobile device 102 to implement encrypt-on-write if able.

While the database file is being downloaded to the mobile device 102, callbacks are made into the client application 104 to allow it to indicate the download progress. When the complete database file is available, another callback is made into the client application 104 to notify it that initial data is available, and therefore the application 104 is ready for use.

IV. Example Computer System Implementation

Figure 4:
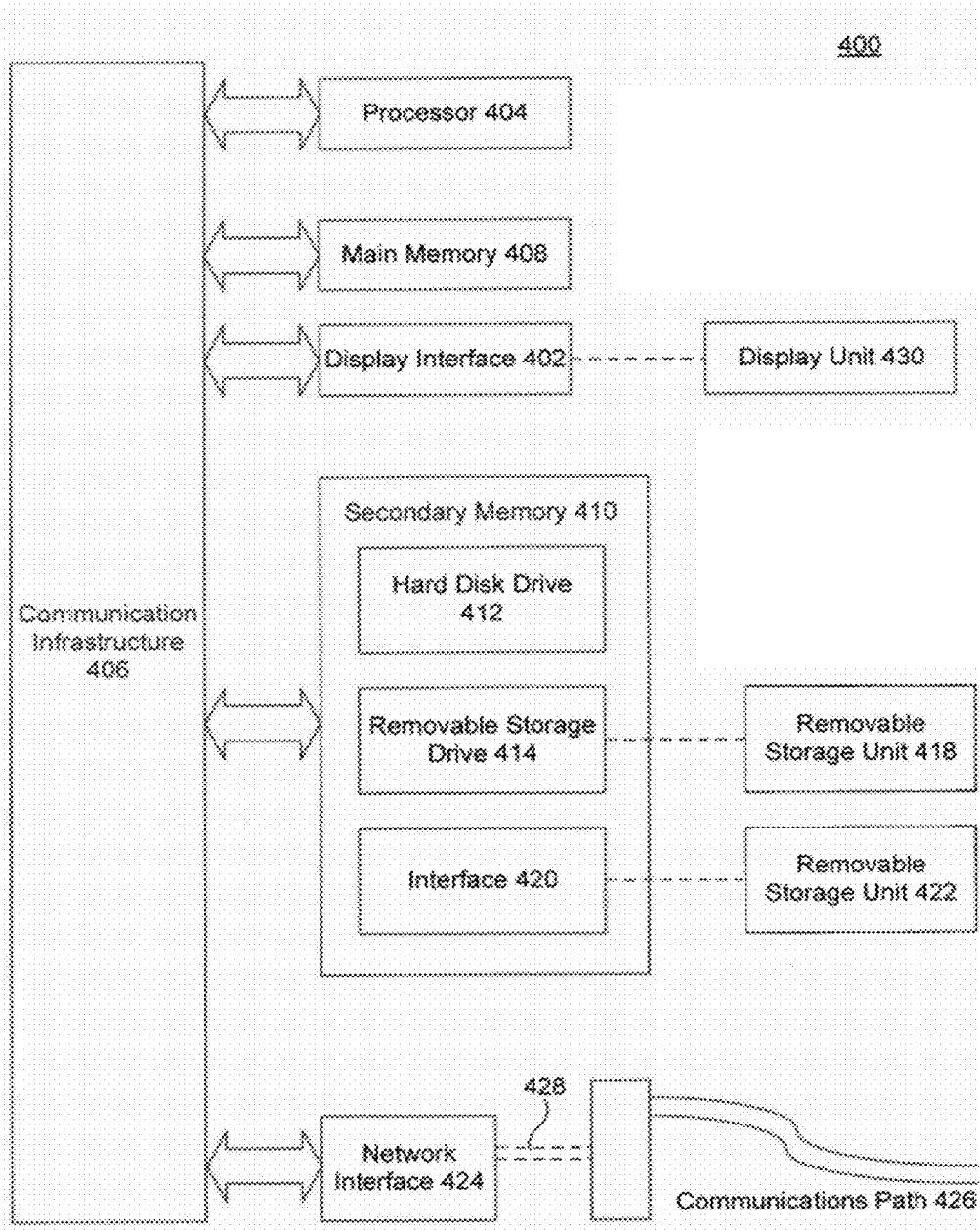
FIG. 4 depicts an example computer system in which embodiments of the present invention may be implemented.

Various aspects of the present invention can be implemented by software, firmware, hardware, or a combination thereof. FIG. 4 illustrates an example computer system 400 in which the present invention, or portions thereof, can be implemented as computer-readable code. For example, the methods illustrated by flowcharts 200 of FIGS. 2 and 300 of FIG. 3, can be implemented in system 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 404. Processor 404 can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive 412, a removable storage drive 414, and/or a memory stick. Removable storage drive 414 may comprise a floppy disk drive, a magnetic tape drive, an optical disk drive, a flash memory, or the like. The removable storage drive 414 reads from and/or writes to a removable storage unit 418 in a well known manner. Removable storage unit 418 may comprise a floppy disk, magnetic tape, optical disk, etc. that is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 that allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals that may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Signals carried over communications path 426 can also embody the logic described herein. Computer program medium and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor 404 to implement the processes of the present invention, such as the steps in the methods illustrated by flowcharts 200 of FIGS. 2 and 300 of FIG. 3, discussed above. Accordingly, such computer programs represent controllers of the computer system 400. Where the invention is implemented using software, the software may be stored in a computer program product and loaded into computer system 400 using removable storage drive 414, interface 420, hard drive 412 or communications interface 424.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for bulk downloading data to a client, comprising:
   receiving, by an information system server located between the client and a central database, a subscription request from the client, wherein a central database stores a database table comprising a set of rows specific to the client, wherein the subscription request comprises a desired database page size of the client;
   invoking a code generator to generate a compatible bulk download program emulating code for use on the client, based on a determination that the bulk download program compatible with the client does not exist;
   impersonating, by the information system server, the client to generate a database file using the compatible bulk download program, wherein the database file comprises at least a portion of the set of rows specific to the client, in a database format compatible with the client, wherein the database format compatible with the client is determined based on the subscription request, and the database format is different from a database format of the database table stored on the central database;
   emulating database software compatible with the client that inserts the set of rows into the database file;
   encrypting a chunk of the database file using a client-specific database encryption key as negotiated between the client and the information system server, wherein the chunk includes a first data page of the database file, wherein the database file includes a second data page that is unencrypted, and wherein the database file is configured to be writable by the client without further encryption;
   selecting a particular one of the data pages;
   determining whether the particular one of the data pages is encrypted based on information contained within another portion of the database file, wherein the another portion includes a page table; and
   transmitting, by the information system server, the database file in chunks to the client including both the encrypted and not encrypted portions, wherein a size of each chunk is one or more times of the desired database page size, wherein the database file is configured to be installed as a local database at the client.

2. The method of claim 1, wherein impersonating the client to generate the database file based on the subscription request comprises:
   generating contents of the database file based on contents of the subscription request.

3. The method of claim 1, wherein impersonating the client to generate the database file based on the subscription request comprises:
   generating contents of the database file specific to the client.

4. The method of claim 1, wherein impersonating the client to generate the database file based on the subscription request comprises:
   selecting a bulk download program compatible with the client; and
   generating the database file using the bulk download program.

5. The method of claim 1, wherein the database file is installed as an initial database at the first client.

6. The method of claim 1, further comprising:
   deleting the database file after the transmitting.

7. The method of claim 1, further comprising compressing the chunk of the database file prior to the transmitting.

8. A computer-readable storage device having computer-executable instructions stored thereon that, if executed by a computing device, cause the computing device to perform operations for bulk downloading data to a client, comprising:

receiving a subscription request from the client, wherein the computer-readable storage device is located between the client and a central database, and the central database stores a database table comprising a set of rows specific to the client and a second set of rows specific to a second client, wherein the subscription request comprises a desired database page size of the client;

invoking a code generator to generate a compatible bulk download program emulating code for use on the client, based on a determination that the bulk download program compatible with the client does not exist;

impersonating the client to generate a database file using the compatible bulk download program, wherein the database file comprises at least a portion of the set of rows specific to the client, in a database format compatible with the client, wherein the database format compatible with the client is determined based on the subscription request, and the database format is different from a database format of the database table stored on the central database;

emulating database software compatible with the client that inserts the set of rows into the database file;

encrypting a chunk of the database file using a client-specific database encryption key as negotiated between the client and the information system server, wherein the chunk includes a first data page of the database file, wherein the database file includes a second data page that is unencrypted, and wherein the database file is configured to be writable by the client without further encryption;

selecting a particular one of the data pages;

determining whether the particular one of the data pages is encrypted based on information contained within another portion of the database file, wherein the another portion includes a page table; and transmitting, by the information system server, the database file in chunks to the client including both the encrypted and not encrypted portions, wherein a size of each chunk is one or more times of the desired database page size, wherein the database file is configured to be installed as a local database at the client.

9. The computer-readable storage device of claim 8, wherein impersonating the client to generate the database file based on the subscription request comprises:
generating contents of the database file based on contents of the subscription request.

10. The computer-readable storage device of claim 8, wherein impersonating the client to generate the database file based on the subscription request comprises:
generating contents of the database file specific to the client.

11. The computer-readable storage device of claim 8, wherein impersonating the client to generate the database file based on the subscription request comprises:
selecting a bulk download program compatible with the client; and
generating the database file using the bulk download program.

12. A system for bulk downloading data to a client, comprising:
a memory configured to store modules on an information system server located between a client and a central database, comprising:
a receiving module, implemented on the memory, configured to receive a subscription request from the client, wherein the information system server is located between the client and a central database, and the central database stores a database table comprising a set of rows specific to the client, wherein the subscription request comprises a desired database page size of the client, an invoking module, implemented on the memory, configured to invoke a code generator to generate a compatible bulk download program emulating code for use on the client, based on a determination that the bulk download program compatible with the client does not exist;

an impersonating module, implemented on the memory, configured to impersonate the client to generate a database file using the compatible bulk download program, wherein the database file comprises at least a portion of the set of rows specific to the client, in a database format compatible with the client, wherein the database format compatible with the client is determined based on the subscription request, and the database format is different from a database format of the database table stored on the central database emulating database software compatible with the client that inserts the set of rows into the database file, a selecting module, implemented on the memory, configured to select a particular one of the data pages;

a determining module, implemented on the memory, configured to determine whether the particular one of the data pages is encrypted based on information contained within another portion of the database file, wherein the another portion includes a page table, and a transmitting module, implemented on the memory, configured to encrypt a chunk of the database file using a client-specific database encryption key as negotiated between the client and the information system server, wherein the chunk includes a first data page of the database file, wherein the database file includes a second data page that is unencrypted, and wherein the database file is configured to be writable by the client without further encryption, and transmit the database file to the client including both the encrypted and not encrypted portions, wherein a size of each chunk is one or more times of the desired database page size, wherein the database file is configured to be installed as a local database at the client; and one or more processors configured to process the modules.

13. The system of claim 12, wherein the impersonating module is further configured to:
generate contents of the database file based on contents of the subscription request.

14. The system of claim 12, wherein the impersonating module is further configured to:
generate contents of the database file specific to the client.

15. The system of claim 12, wherein the impersonating module is further configured to:
select a bulk download program compatible with the client; and
generate the database file using the bulk download program.

* * * * *